United States Patent [19]

Himes et al.

[11] Patent Number: 4,977,962

[45] Date of Patent: Dec. 18, 1990

[54] FLUID ADDITIVE AND METHOD FOR TREATMENT OF SUBTERRANEAN FORMATIONS

[75] Inventors: Ronald E. Himes; David E. Simon, both of Duncan, Okla.

[73] Assignee: Halliburton Company, Duncan, Okla.

[21] Appl. No.: 330,232

[22] Filed: Mar. 28, 1989

[51] Int. Cl.$^5$ .................... E21B 43/22; E21B 43/26
[52] U.S. Cl. .................... 166/305.1; 166/308; 166/312; 252/8.551; 252/8.552
[58] Field of Search .............. 166/271, 275, 305.1, 166/308, 312; 252/8.551, 8.552, 8.554

[56] References Cited

U.S. PATENT DOCUMENTS

| | | | |
|---|---|---|---|
| 3,199,591 | 8/1965 | Kepley | 252/8.551 X |
| 3,753,233 | 8/1973 | Svaldi et al. | 166/308 |
| 3,797,574 | 3/1974 | Feuerbacher et al. | 166/305.1 X |
| 4,466,890 | 8/1984 | Briscoe | 252/8.551 |
| 4,842,073 | 6/1989 | Himes et al. | 166/308 X |

*Primary Examiner*—George A. Suchfield
*Attorney, Agent, or Firm*—Robert A. Kent

[57] ABSTRACT

A method of substantially preventing the adsorption of polysaccharides or removing polysaccharides from clay surfaces in subterranean formations which are present as a result of contact by gravel packing, fracturing or other treatment fluids, by contacting the formation with a treatment fluid containing at least one member selected from the group consisting of tetraalkylammonium halides wherein the alkyl radical is selected from methyl, ethyl, propyl and butyl radicals and trimethylammonium halides present in an amount sufficient to substantially remove any polysaccharides adsorbed by said clays whereby the permeability of the formation is substantially maintained.

4 Claims, No Drawings

FLUID ADDITIVE AND METHOD FOR TREATMENT OF SUBTERRANEAN FORMATIONS

BACKGROUND OF THE INVENTION

1. Field of the Invention

The present invention relates to a method and fluid additive for use in treating subterranean formations containing clays and particularly for use in stimulation fluids such as fracturing fluids.

2. Description Of The Prior Art

Hydraulic fracturing is commonly employed to increase the production of fluids from a subterranean formation. Hydraulic fracturing involves the injection of a suitable fracturing fluid down a well penetrating a formation and into the formation under sufficient pressure to create a crack or fracture in the formation. The created crack or passageway facilitates the flow of fluids through the formation and into the well.

In a typical fracturing treatment a particulate propping agent such as sand, sintered bauxite, glass beads, alumina, resin coated sand or the like is introduced into the created fracture to assist in keeping the fracture at least partially propped in an open position. The propped open passageway further enhances the flow of formation fluids. To facilitate transport of the proppant material into the created fractures, the fracturing fluid typically is viscosified with one or more of the various well known polysaccharide gelling agents. The gelling agent imparts viscosity to the fluid thereby permitting enhanced proppant transport and reduces fluid loss from the fracturing fluid to the formation. As the gelled fracturing fluid is introduced into contact with the subterranean formation, a portion of the fluid leaks off into the formation. As the fluid leaks off into the formation matrix, the gelling agent is deposited on the face of the created fracture and is concentrated thereon by the action of filtration as additional fluid leaks-off. The gelling agent often is admixed with a crosslinking agent to further enhance the viscosity of the fracturing fluid.

Combination fracture-acidizing processes also are well known in the art. In such processes an aqueous acid is admixed with a suitable viscosifier and utilized in the formation treatment resulting in enhanced formation permeability.

Upon conclusion of the fracturing treatment, the fracture is permitted to close upon the propping agent and at least a portion of the treatment fluid generally is flowed back to the surface for removal. To facilitate return of the viscosified fluid, additives commonly referred to as "breakers" are included in the fluid by reaction with the polysaccharide gelling agent which is present in the fluid.

It has been found that when the subterranean formation contains clays, such as smectite, illite, kaolinite, chlorite and mixed layer clays and the like, that the gelling agent can be adsorbed by the clays during the treatment of the formation and result in a significant reduction in formation permeability. The polysaccharide gelling agent adsorbs on the clay platelets between the layers, swelling the clay structure and reducing the permeability of the formation.

It would be desirable to provide a method by which the adsorbed polysaccharides can be removed from the clays to thereby increase the formation permeability.

SUMMARY OF THE INVENTION

The surprising discovery now has been made that a fluid additive comprising at least one member selected from the group consisting of tetraalkylammonium halides wherein the alkyl group is selected from methyl, ethyl, propyl and butyl radicals and trimethylammonium halides can be admixed with a fracturing fluid to substantially prevent the adsorption of polysaccharides by clays in the formation and with other treatment fluids to remove previously adsorbed polysaccharides from the clays. The additive is admixed with the treatment fluid in an effective amount whereby polysaccharides are at least partially prevented from adsorbing on the clays or partially removed after being adsorbed whereby formation permeability is enhanced.

DESCRIPTION OF THE PREFERRED EMBODIMENT

Hydraulic fracturing has been utilized for many years to stimulate the production of oil, gas or other formation fluids from subterranean formations. In hydraulic fracturing, a suitable fluid is introduced into a subterranean flow rate and pressure which are at least sufficient to create or extend a fracture into a desired portion of the formation. The fracturing fluid normally carries in it a proppant which is forced into the fracture or fractures to keep the broken formation from closing completely once the pressure is released. Various fluids have been utilized in hydraulic fracturing, however, most fluids utilized today are aqueous-based liquids.

The fracturing fluid is prepared by admixing a quantity of a solvatable polysaccharide gelling agent with an aqueous liquid. The solvatable polysaccharides include galactomannan gums, glucomannan gums, cellulose derivatives and the like. Examples of suitable polysaccharides include guar gum, hydroxypropylguar, carboxymethylcellulose, hydroxyethylcellulose, carboxymethylhydroxyethylcellulose and carboxymethylhydroxypropylguar.

Surprisingly, it has been found that the use of a fluid additive comprising at least one member selected from the group of tetraalkylammonium halides wherein the alkyl group is selected from methyl, ethyl, propyl and butyl radicals and trimethylammonium halide in a fracturing fluid can result in the removal of at least a portion of any polysaccharides adsorbed by clays present in a subterranean formation or substantial prevention of adsorbed polysaccharides by the clays whereby formation permeability is maintained or enhanced. The halide can comprise fluorine, chlorine, bromine or iodine. The preferred halides are chlorine and bromine. The performance of the additive of the present invention is unaffected by the counter-ion (anion) species present in the additive. It is to be understood that sulfates, nitrates and the like could also be utilized.

The fluid additive of the present invention is suitable for use in substantially any treatment fluid in which a gelling agent is present and in which the treatment fluid will contact a subterranean formation containing clays. For example, the fluid additive may be utilized in fracturing fluids, gravel packing fluids, temporary diverting fluids and the like in which a polysaccharide gelling agent is present.

The fluid additive is admixed with the fracturing fluid or other treatment fluid in an effective amount to substantially prevent polysaccharides from being adsorbed on clays in the formation or to substantially remove polysaccharides which previously have been adsorbed. Preferably, the fluid additive of the present invention is admixed with the aqueous fracturing fluid or other treatment fluid in an amount of at least about 0.05 percent by weight of the fracturing or treatment fluid. Most preferably the fluid additive is present in an amount of from about 0.1 to about 5 percent by weight of the fracturing fluid or other treatment fluid.

The fluid additive of the present invention can be admixed with the fracturing fluid or other treatment fluid at any time prior to contact of the fluid with the subterranean formation. In that the fluid additive is readily available as either a particulate solid or a liquid solution, it readily admixes with the constituents of the fracturing fluid or other treatment fluid and does not detrimentally effect hydration of any polysaccharide gelling agent.

The use of the present fluid additive is particularly advantageous in stimulation treatments performed with liquid gel concentrates such as for example those described in U.S. Pat. Nos. 4,312,675, 4,435,217,; 3,894,880; 3,894,879; and 4,466,890, the disclosures of which are incorporated herein by reference. The fluid additive is effective in treating a subterranean formation when transported in a carrier fluid such as a fracturing fluid having either an acid, alkaline or neutral pH.

The fluid additive may be admixed with the constituents or aqueous liquid gel concentrate during its preparation whereupon it remains storage stable or admixed with the gel concentrate when the gelled fracturing fluid is prepared by introduction into a mixing vessel or blender together with the other fracturing fluid additives. The fluid additives of the present invention do not appear to have any significant detrimental effect upon the hydration or ultimate yield of the gelling agent utilized to prepare the fracturing fluid.

To illustrate the effectiveness of the fluid additives at preventing substantial permeability reduction by polysaccharide adsorbed from the fluid upon clays upon contact of an aqueous fluid with a formation, the following examples are presented. The examples are not to be considered as limitations upon the scope of the present invention but are presented for illustration only. All quantities, proportions and percentages are by weight and all tests were performed at room temperature (75° F.) unless otherwise indicated.

EXAMPLE I

To demonstrate the ability of the composition of the present invention to remove polysaccharides from clay particles, the following adsorption tests were performed. Samples were prepared by taking ten milliliters of a three percent smectite slurry which was mixed with 40 milliliters of the base fluid set forth in Table I containing the gelling agents identified in the table. The smectite slurry was prepared by admixing three percent by weight smectite with deionized water. Testing then was performed at 75° F. and 180° F. The tests at 180° F. utilized a constant temperature water bath. The samples containing gelling agent were admixed with a sufficient quantity of either an enzyme breaker or an oxidizing breaker such as a persulfate breaker or the like to achieve a gel break in four hours at the test temperature.

After twenty four hours the fluid samples were centrifuged, the liquid decanted off and the solids were dispersed in deionized water. The samples then were again centrifuged, the deionized water decanted off and the smectite complex dispersed in 15 milliliters of deionized water. An oriented clay slide was prepared by placing 1.0 milliliter of the dispersed complex on a polished metal slide which was allowed to dry at room temperature. X-ray diffraction analyses were performed on each air dried sample on a Philips APD 3600 diffractometer using copper radiation. Instrumental settings for the ADP 3600 were as follows:

Voltage: 45KV
Amperage: 40Ma
Step size: 0.02 degrees
Count time: 2.0 seconds
Scan range: 2–14 degrees The remainder of each smectite complex sample was then admixed with the respective base fluid and washed four times with the base fluid. The samples then were washed with deionized water, dispersed in 15 milliliters of deionized water and a slide prepared as described above. The remaining dispersed smectite complex then was washed four times with the respective base fluid to which was added the fluid additive of the present invention in an amount equivalent to five gallons (50% active) per 1000 gallon of water in the base fluid. After a final deionized water wash, a slide was prepared as described above and x-ray diffraction analyses were performed on the sample slides. The results are set forth in Table II below:

TABLE I

| Sample No. | Base Fluid | Gelling Agent in Base Fluid Concentration, (pounds per 1000 gal. of aqueous fluid) | Temperature °F. | $d_{001}$[1] nm |
|---|---|---|---|---|
| 1. | Deionized water | — | 75 | 1.52, 1.28 |
|  |  |  | 180 | 1.52, 1.28 |
| 2. | 2% KCL | — | 75 | 1.24, |
|  |  |  | 180 | 1.26 |
| 3. | 2% NH4Cl | — | 75 | 1.26 |
|  |  |  | 180 | 1.26 |
| 4. | Deionized water | hydroxypropyl guar (40) | 75 | 1.92 |
|  |  |  | 180 | 1.88 |
| 5. | Deionized water | guar (40) | 75 | 2.31, 1.84 |
|  |  |  | 180 | 1.84 |
| 6. | Deionized water | hydroxyethyl-cellulose (40) | 75 | 2.38, 1.80 |
|  |  |  | 180 | 2.32, 1.80 |
| 7. | Deionized water/ fluid additive 5 gal/1000 gal (50% active) |  |  |  |
|  | TMAC[2] | — | 75 | 1.40 |
|  |  |  | 180 | 1.40 |
|  | TEAC[3] | — | 75 | 1.43 |
|  |  |  | 180 | 1.43 |
|  | TPAB[4] | — | 75 | 1.46 |
|  |  |  | 180 | 1.46 |
|  | TBAB[5] | — | 75 | 1.68, 1.50 |
|  |  |  | 180 | 1.68, 1.50 |
|  | TRIMAC[6] | — | 75 | 13.3 |
|  |  |  | 180 | 13.3 |

[1]This value represents the C-axis spacing of the clay complexes which is the sum of the thickness of the clay layer (approximately 0.95 nanometer) and the thickness of the adsorbed species between adjoining clay layers.
[2]TMAC: tetramethylammonium chloride
[3]TEAC: tetraethylammonium chloride
[4]TPAB: tetrapropylammonium bromide
[5]TBAB: tetrabutylammonium bromide
[6]TRIMAC: trimethylammonium chloride

TABLE II

| Treatment | Gel-Smectite $d_{001}$, nm | Agent-Smectite $d_{001}$, nm | $\frac{I_c}{I_c + I_G}$ [1] |
|---|---|---|---|
| | | 40 lb/1000 gal hydroxypropyl guar 75° F. Tests | |
| Deionized water base fluid | 2.10 | — | 0 |
| base fluid washes | 1.92 | — | 0 |
| TMAC fluid additive washes | — | 1.43 | 1.00 |
| 2% KCL base fluid | 2.38 | 1.25 | 0.38 |
| base fluid washe | 2.45 | 1.24 | 0.34 |
| TMAC fluid additive washes | — | 1.43 | 1.00 |
| 2% NH$_4$Cl base fluid | 2.59 | 1.26 | 0.48 |
| base fluid washes | 2.52 | 1.26 | 0.42 |
| TMAC fluid additive washes | — | 1.46 | 1.00 |
| Deionized water w/TMAC fluid additive as base fluid | — | 1.47 | 1.00 |
| TMAC fluid additive washes | — | 1.42 | 1.00 |
| Deionized water w/TEAC fluid additive as base fluid | — | 1.43 | 1.00 |
| TEAC fluid additive washes | — | 1.41 | 1.00 |
| Deionized water w/TPAB fluid additive as base fluid | — | 1.46 | 1.00 |
| TPAB fluid additive washes | — | 1.46 | 1.00 |
| Deionized water w/TBAB fluid additive as base fluid | — | 1.67, 1.48 | 1.00 |
| TBAB fluid additive washes | — | 1.71, 1.43 | 1.00 |
| Deionized water w/TRIMAC fluid additive as base fluid | 1.70 | 1.40 | 0.31 |
| TRIMAC fluid additive washes | — | 1.38 | 1.00 |
| | | 40 lb/1000 gal hydroxypropyl guar 180° F. Tests | |
| Deionized water base fluid | 1.96 | — | 0 |
| base fluid washes | 1.88 | — | 0 |
| TMAC fluid additive washes | — | 1.47 | 1.00 |
| 2% KCL base fluid | 2.38 | 1.38 | 0.34 |
| base fluid washes | 2.38 | 1.28 | 0.36 |
| TMAC fluid additive washes | — | 1.43 | 1.00 |
| 2% NH$_4$Cl base fluid | 2.45 | 1.32 | 0.43 |
| base fluid washes | 2.26 | 1.28 | 0.53 |
| TMAC fluid additive washes | — | 1.45 | 1.00 |
| Deionized water w/TMAC fluid additive as base fluid | — | 1.42 | 1.00 |
| TMAC fluid additive washes | — | 1.42 | 1.00 |
| | | 40 lb/1000 gal guar 75° F. Tests | |
| Deionized water base fluid | 2.15 | — | 0 |
| base fluid washes | 2.32, 1.84 | — | 0 |
| TMAC fluid additive washes | — | 1.43 | 1.00 |
| 2% KCL base fluid | 2.45 | 1.28 | 0.36 |
| base fluid washes | 2.45 | 1.29 | 0.35 |
| TMAC fluid additive washes | — | 1.42 | 1.00 |
| 2% NH$_4$Cl base fluid | 2.52 | 1.25 | 0.44 |
| base fluid washes | 2.52 | 1.27 | 0.42 |
| TMAC fluid additive washes | — | 1.42 | 1.00 |
| Deionized water w/TMAC fluid additive as base fluid | — | 1.45 | 1.00 |
| TMAC fluid additive washes | — | 1.42 | 1.00 |
| | | 40 lb/1000 gal guar 180° F. Tests | |
| Deionized water base fluid | 2.01 | — | 0 |
| base fluid washes | 1.86 | — | 0 |
| TMAC fluid additive washes | — | 1.43 | 1.00 |
| 2% KCL base fluid | 3.27 | 1.28 | 0.25 |
| base fluid washes | 2.94 | — | 0 |
| TMAC fluid additive washes | — | 1.44 | 1.00 |
| 2% NH$_4$Cl base fluid | 3.27 | 1.28 | 0.31 |
| base fluid washes | 2.94 | 1.25 | 0.18 |
| TMAC fluid additive washes | — | 1.44 | 1.00 |
| Deionized water w/TMAC fluid additive as base fluid | — | 1.44 | 1.00 |
| TMAC fluid additive washes | — | 1.42 | 1.00 |
| | | 40 lb/1000 gal hydroxyethylcellulose 75° F. | |
| Deionized water base fluid | 2.1 | — | 0 |
| base fluid washes | 2.39, 1.80 | — | 0 |
| TMAC fluid additive washes | 2.26, 1.84 | 1.46 | 0.15 |
| 2% KCL base fluid | 2.52 | — | 0 |
| base fluid washes | 2.60 | — | 0 |
| TMAC fluid additive washes | 2.32, 1.73 | 1.45 | 0.09 |
| 2% NH$_4$Cl base fluid | 2.67 | — | 0 |
| base fluid washes | 2.41 | — | 0 |

TABLE II-continued

| Treatment | Gel-Smectite $d_{001}$, nm | Agent-Smectite $d_{001}$, nm | $\frac{I_C}{I_C + I_G}$ [1] |
|---|---|---|---|
| TMAC fluid additive washes | 2.22 | 1.46 | 0.40 |
| Deionized water w/TMAC fluid additive as base fluid | 2.32 | 1.42 | 0.47 |
| TMAC fluid additive washes | 2.26 | 1.45 | 0.64 |
| 40 lb/1000 gal hydroxyethylcellulose 180° F. Tests | | | |
| Deionized water base fluid | 2.15 | — | 0 |
| base fluid washes | 2.32, 1.80 | — | 0 |
| TMAC fluid additive washes | 2.26, 1.88 | 1.47 | 0.13 |
| 2% KCL base fluid | 2.20 | — | 0 |
| base fluid washes | 2.67 | — | 0 |
| TMAC fluid additive washes | 2.39 | 1.44 | 0.12 |
| 2% NH$_4$Cl base fluid | 2.52 | — | 0 |
| base fluid washes | 2.52 | — | 0 |
| TMAC fluid additive washes | 2.38 | 1.47 | 0.16 |
| Deionized water w/TMAC fluid additive as base fluid | 2.32 | 1.41 | 0.45 |
| TMAC fluid additive washes | 2.15 | 1.44 | 0.46 |

[1] The ratio represents a proportionally relationship of the relative amounts of the gel-smectite form of the complex to the agent-smectite form created by contact with the fluid additive of the present invention or the cation in the base fluid as a result of integration of the peak areas for the complexes x-ray diffraction data.

The foregoing proportionality data clearly illustrate that the fluid additive of the present invention prevents adsorption of polysaccharide gelling agents by clay and will remove previously adsorbed polysaccharides from the interlayer region of the clays. The proportionality relationship provides a measure of the effectiveness of replacement of the polysaccharide by the treating agent. This value is a ratio of the net diffraction peak area for the agent-smectite to the sum of the net diffraction peak area of the gel-smectite and the agent-smectite. A value of zero indicates no removal of the polysaccharide from the smectite clay. A value of 1.00 indicates complete removal of the polysaccharide from the interlayer region of the clay particles. In contrast to the fluid additive of the present invention, KCl and NH$_4$Cl did not inhibit adsorption of the polysaccharide and demonstrated no capability of removing adsorbed polysaccharide from the interlayer region of the smectite clay.

EXAMPLE II

To illustrate the effect of the additive of the present invention upon formation permeability, the following flow rate retention tests were performed.

Flow tests were performed through sand packs containing 85% Oklahoma No. 1 sand, 10% silica flour and 5% Wyoming bentonite clay, by weight. Automated test equipment was utilized to minimize operator effects and all tests were performed at 145° F. In each test, the sand pack was allowed to equilibrate to the test temperature and the initial permeability of the pack was determined utilizing API brine. Thereafter the pack was treated with 200 milliliters of a treatment solution and a return permeability to API brine was determined. A 400 milliliter quantity of a wash fluid then was passed through the pack followed by a final determination of permeability to API brine.

The first test utilized a treatment solution containing 50 lbs/1000 gallons of aqueous of hydroxypropylguar which had been broken with 0.1 lb of an enzyme breaker/1000 gallons of aqueous solution while maintained at 100° F. for about 16 hours. The treatment solution also contained 4% by weight potassium chloride. The high potassium chloride level was utilized to ensure the bentonite clay maintained stability whereby clay swelling could be eliminated as a factor in the test procedure. The broken gel was filtered through Whatman No. 50 paper before introduction into the sand pack to remove insoluble residues. The wash fluid was a 4% potassium chloride solution.

The second test was performed in the same manner as the first test except the treatment solution also contained 5 gal/1000 gallons of aqueous of a 50% active solution of the tetramethylammonium chloride additive of the present invention. The wash fluid also contained the additive of the present invention at a rate of 5 gal/1000 gallons of aqueous.

The third test was performed in the same manner as the first test except that the additive of the present invention was present only in the wash fluid in an amount of 5 gal/1000 gallons of aqueous.

The results of the flow rate retention tests are set forth in Table III, below:

TABLE III

| Test No. | % Flow Retention After Treatment Solution | % Flow Retention After Wash Fluid |
|---|---|---|
| 1 | 60.2 | 63.8 |
| 2 | 71.1 | 73.9 |
| 3 | 63.6 | 75.6 |

TABLE III

The results of tests 2 and 3 clearly demonstrate the ability of the fluid additive of the present invention to remove adsorbed polysaccharides or substantially prevent polysaccharide adsorption by the clays present in the simulated formation. Analogous results would be expected from the use of the other compounds of the present invention in the foregoing test in the view of the results of Example I.

While that which is considered to be the preferred embodiment of the invention has been described hereinbefore, it is to be understood that modifications and changes can be made in the method of the present invention without departing from the spirit or scope of the invention as set forth in the following claims.

What is claimed is:

1. A method of removing a polysaccharide adsorbed on a clay contained in a subterranean formation comprising:

injecting an aqueous treatment fluid into a subterranean formation, said fluid including at least about 0.05 percent by weight of a fluid additive comprising at least one member selected from the group of tetraalkylammonium halides wherein the alkyl group is selected from methyl, ethyl, propyl and butyl radicals and trimethylammonium halide and maintaining said treatment fluid within said subterranean formation and in contact with said clay for a sufficient time to remove at least a portion of the adsorbed polysaccharide from the clay.

2. The method of claim 1 wherein the fluid additive is present in an amount of from about 0.1 to about 5 percent by weight in said treatment fluid.

3. The method of claim 1 wherein said fluid additive is tetramethylammonium chloride.

4. The method of claim 1 wherein said fluid additive is tetraethylammonium chloride.

* * * * *

UNITED STATES PATENT AND TRADEMARK OFFICE
CERTIFICATE OF CORRECTION

PATENT NO.   :  4,977,962

DATED        :  Dec. 18, 1990

INVENTOR(S)  :  Ronald E. Himes and David E. Simon

It is certified that error appears in the above-identified patent and that said Letters Patent is hereby corrected as shown below:

Column 2, line 24, between the words "subterranean" and "flow", insert -- formation by way of a wellbore under conditions of --.

Signed and Sealed this

Seventeenth Day of November, 1992

Attest:

DOUGLAS B. COMER

Attesting Officer

Acting Commissioner of Patents and Trademarks